(No Model.)
S. BAKER.
WHIP BUTTON.
No. 364,886. Patented June 14, 1887.
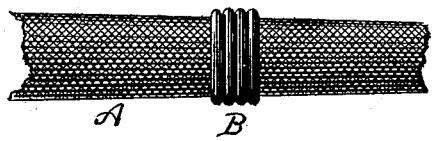
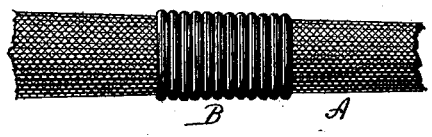
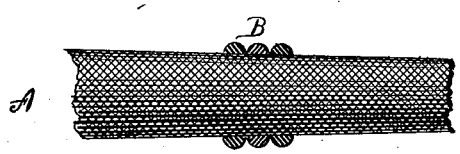
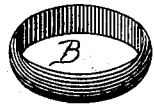
WITNESSES
Norris A. Clark.
J. R. Drake,
INVENTOR
Samuel Baker.
By J. R. Drake.
Atty.

UNITED STATES PATENT OFFICE.

SAMUEL BAKER, OF BUFFALO, NEW YORK.

WHIP-BUTTON.

SPECIFICATION forming part of Letters Patent No. 364,886, dated June 14, 1887.

Application filed October 20, 1886. Serial No. 216,720. (No model.)

*To all whom it may concern:*

Be it known that I, SAMUEL BAKER, a citizen of the United States, residing at Buffalo, in the county of Erie and State of New York, have invented certain new and useful Improvements in Whip-Buttons; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a cheaper, better, and more durable button or finish for whips, to do away with those now generally in use made or woven by hand of threads and then plaited on the whip or over ridges or molds of wood or metal.

The invention consists in forming the button of two or more rubber rings that are made or molded half-round—that is, the inside flat or concave, so as to hug the stick and adapt itself to the tapering form of the whip, and the outside half-round, either plain or ornamented, all as fully hereinafter explained.

In the drawings, Figure 1 shows two side views of a button as it looks on a whip; Fig. 2, section of a whip, showing the half-round rubber buttons thereon in cross-section; Fig. 3, perspective of a single rubber ring, showing the flat inner face and round outside; Fig. 4, cross-section of a single ring having a concave inner face.

A represents a portion of a whip-stock.

B represents a series of rubber rings with rounded outsides and flat insides—that is, half-round on the surface exposed and flat inside on the part that sets on the whip, as shown in Figs. 2 and 3, Fig. 4 being concave inside instead of flat, the effect aimed at being the same, except making the rings lighter and holding the cement better when put on the whip. These rings, put on in groups of two or more, make a "finish" to the whip that possesses advantages over any others known to the trade.

The objections to metal buttons or ferrules are that they work loose and dampness corrodes and rusts them. Those of wood covered with thread have to be made by hand in a great many sizes to accommodate to different positions on whips, and wet weather or dampness loosens the glue or gluten with which they are stuck on, unraveling the threads and softening them, making them sticky and ragged, and frequently causing them to fall off. They also all cost more and require considerable hand-work.

The advantages of my rubber buttons are that they are formed or molded in dies in large quantities and at a cost of less than one-fourth of the thread ones worked on by hand, which are the ones now most used. A very few variations in sizes of mine will fit any and all sizes and styles of whips. They, being elastic, will stretch to the required size and position, and, when on, the flat inner surface holds tightly to the whip, and when the glue or cement is put on they become immovable and on them moisture has absolutely no effect. The common round rubber ring used for bands, &c., will not answer for buttons of whips at all, as the inside being round makes them easily moved, hard to stick together, and present too high a ridge around the whip. Such rings I disclaim as not being suitable. My half-round rings in series may be united before or after putting on, and as wide or narrow as may be fancied or desired, and the surface ornamented by lines, imitation of braid, &c.

Another great advantage in this construction of ring is that they accommodate themselves to the tapering form of the whip, and do not have to be made especially to fit such taper. The convex inner face, B', as in Fig. 4, will, it is thought, hold more glue or cement, hold tighter to the whip, and will be a little lighter in weight, reducing the cost somewhat. The saving in labor over the ordinary whip-buttons, and especially those which are worked with prepared thread, (which has to be made by special machinery,) and then plaited on the whip or over wooden molds, &c., by hand, is very great, and a consequent saving in expense, besides making a handsomer appearance, they being painted or colored, according to fancy.

I am aware that ferrules and buttons have been made for whips of leather, but not in rings such as I describe, and while leather is to a slight degree flexible it is not elastic and will not return to its original proportions if stretched like rubber or rubber composition. It is possible that some other equally or superior elastic compound like rubber may be found. If so I desire the benefit of it for this purpose.

I disclaim, in this connection for whip-buttons, either leather, wood, or metal, as such are old, as are also whip-butts and single flat ferrules made of india-rubber.

I also disclaim rubber coverings or ferrules for fishing-poles.

I claim—

The whip-button herein described, consisting of the elastic rubber or rubber-composition rings B, molded or formed half-round in cross-section, and in various sizes, so that their interior will fit closely on the tapering surface of a whip and set together thereon in series, substantially as specified.

In testimony whereof I affix my signature in presence of two witnesses.

SAMUEL BAKER.

Witnesses:
T. H. PARSONS,
J. R. DRAKE.